United States Patent
Pietrocola et al.

(10) Patent No.: US 6,626,183 B1
(45) Date of Patent: Sep. 30, 2003

(54) RUB-ON FINGERNAIL ART

(75) Inventors: Anna Pietrocola, Hawthorne, NJ (US); Drew Edell, Upper Montclair, NJ (US)

(73) Assignee: CCA Industries, Inc., East Rutherford, NJ (US)

( * ) Notice: Subject to any disclaimer, the term of this patent is extended or adjusted under 35 U.S.C. 154(b) by 0 days.

(21) Appl. No.: 10/036,051

(22) Filed: Dec. 28, 2001

(51) Int. Cl.⁷ .................. A45D 29/00; B32B 33/00
(52) U.S. Cl. ............................ 132/73; 428/41.8
(58) Field of Search ................... 132/200, 285, 132/73; 428/41.6, 41.7, 41.8, 914; 427/147; 156/90, 277; D20/11; 206/581

(56) References Cited

U.S. PATENT DOCUMENTS

| | | | |
|---|---|---|---|
| 2,633,139 A | * | 3/1953 | Pettey ................. 132/73 |
| 3,898,357 A | | 8/1975 | Miller et al. |
| 4,960,587 A | | 10/1990 | Rucker |
| 5,269,330 A | | 12/1993 | Hayes |
| 5,302,224 A | | 4/1994 | Jenkins et al. |
| 5,415,903 A | * | 5/1995 | Hoffman et al. ........... 428/15 |
| D380,867 S | | 7/1997 | Agee, II et al. |
| 5,714,221 A | | 2/1998 | Sugibuchi |
| 5,724,999 A | | 3/1998 | Kim |
| 5,782,248 A | * | 7/1998 | Chang ................ 132/200 |
| 5,813,415 A | * | 9/1998 | Slali .................... 132/73 |
| 5,824,395 A | | 10/1998 | Zemel |
| 5,873,375 A | | 2/1999 | Johnson et al. |
| 5,890,495 A | | 4/1999 | Cain |
| 5,931,166 A | | 8/1999 | Weber et al. |
| 5,942,065 A | | 8/1999 | Biggs et al. |
| 5,960,798 A | | 10/1999 | Jenkins et al. |
| 6,053,178 A | | 4/2000 | Todd |
| 6,189,541 B1 | | 2/2001 | Jenkins et al. |
| 6,484,514 B1 | * | 11/2002 | Joseph et al. ............... 62/4 |

* cited by examiner

Primary Examiner—Eduardo C. Robert
Assistant Examiner—David Comstock
(74) Attorney, Agent, or Firm—Fattibene & Fattibene; Paul A. Fattibene; Arthur T. Fattibene

(57) ABSTRACT

A system for decorating nails, including fingernails and toenails, using rub-on or pressure sensitive art or decals. A transparent carrier sheet has a rub-on transfer art for positioning over a fingernail. By rubbing on the top surface of the carrier sheet, the rub-on transfer art is transferred to the fingernail. In one embodiment, a release sheet attached to the carrier sheet is used to hold the carrier sheet and attached rub-on transfer art in position over a fingernail, facilitating placement and transfer. In another embodiment, adhesive is used on the carrier sheet to hold the carrier sheet in position over the fingernail. In yet another embodiment, a tube structure is utilized and placed over the finger for holding in position over the fingernail the rub-on transfer art attached to the carrier sheet. The present invention permits fingernails to be decorated without the use of liquid nail polish, adhesives, or wet decals and, therefore, needs no time to dry and can be done quickly, neatly, and easily.

11 Claims, 4 Drawing Sheets

RUB-ON FINGERNAIL ART

FIELD OF THE INVENTION

The present invention relates generally to fingernail decorating, and particularly to transferring a decoration or art to a fingernail by a pressure sensitive rubbing process.

BACKGROUND OF THE INVENTION

Fingernails have been decorated for a long time. Initially, fingernails had been decorated by painting with fingernail polish. In many situations, when a more intricate design is desired, stencils are often used. Additionally, stick-on or wet decals have been applied to fingernails. Wet decals require submerging the decal in water and then carefully removing the rather delicate wet decal from a backing and then applying it to the fingernail. Generally a period of time is required for the wet decal to dry. Additionally, care must be taken to prevent the decal from shifting or wrinkling on the fingernail. Adhesive decals that are fixed upon contact are often difficult to position accurately and once adhered, are difficult or impossible to remove and reposition.

A decal for decorating nails is disclosed in U.S. Pat. No. 3,898,357 entitled "Methods and Decal Apparatus For Decorating The Nails of Fingers and Toes" issuing to Miller et al on Aug. 5, 1975. Therein disclosed is an adhesive means on a decal adapted to be released and transferred adherently to a nail. The adhesive is preferably water activated. Another nail decorating method is disclosed in U.S. Pat. No. 5,724,999 entitled "Method of Decorating A Fingernail" issuing to Kim on Mar. 10, 1998. Therein disclosed is a method of removing an image from glossy coated paper, such as a magazine, with a film forming substance and applying the image to a fingernail. Another method of decorating fingernails is disclosed in U.S. Pat. No. 5,782,248 entitled "Method For Applying French Manicures To Fingernails" issuing to Chang on Jul. 21, 1998. Therein disclosed is a French manicure style decal applied to the fingernail using an adhesive material.

While these prior techniques for decorating or applying art to a fingernail or toenail have adequately decorated a person's nails, they are often difficult to use, requiring the use of water or paint that results in a relatively long time to dry before becoming durable. Additionally, many prior fingernail decorating methods result in difficult positioning of the art on the nail. Therefore, there is a need for a simpler, more convenient and quicker apparatus and method for applying a decoration or art to a fingernail or toenail.

SUMMARY OF THE INVENTION

The present invention comprises a carrier sheet containing a pressure sensitive dry rub-on transfer art or decoration to be applied to a nail, such as a fingernail or a toenail. In one embodiment, a release sheet is connected to the carrier sheet and aids in holding the carrier sheet containing the rub-on transfer art or decoration in a desired position over a nail. In another embodiment, an adhesive is used on a small portion of the carrier sheet to hold the carrier sheet in position over a nail. In yet another embodiment, a tubular structure is utilized to hold the carrier sheet in position with the rub-on transfer art placed as desired over the nail. The method of decorating a nail is achieved by placing a carrier sheet with a dry rub-on transfer art attached over a nail. Rubbing the carrier sheet over the transfer art transferring the art to the nail. After removing the carrier sheet from the fingernail, a sealer may be applied to protect the art.

Accordingly, it is an object of the present invention to provide a quick and easy apparatus and method for applying decorations or art to nails.

It is a further object of the present invention to decorate nails with little or no mess.

It is an advantage of the present invention that no water or liquid paints are used and no drying time is needed.

It is a further advantage of the present invention that the applied art or decoration is durable and long lasting.

It is a feature of the present invention that a pressure sensitive dry rub-on transfer art is applied to a nail.

It is a further feature of the present invention that in one embodiment a release sheet is connected to a transfer sheet by a hinge and is used to hold the transfer sheet in position over a nail.

It is yet a further feature of the present invention that in one embodiment a tube structure is formed from a carrier sheet and a release sheet to hold the carrier sheet in position over a nail during a dry rub-on transfer process.

These and other objects, advantages, and features will become readily apparent in view of the following more detailed description.

DETAILED DESCRIPTION OF THE PREFERRED EMBODIMENTS

Figure 1:
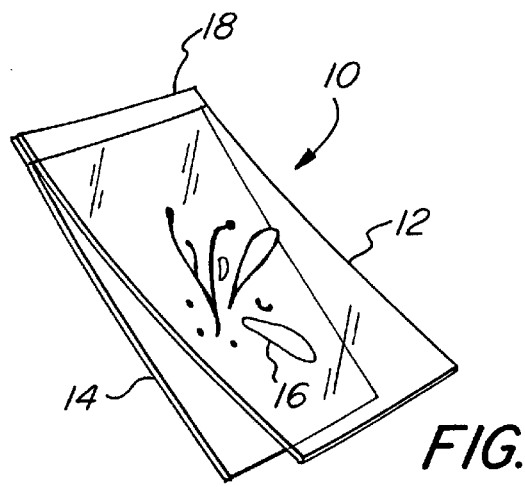
FIG. 1 is a perspective view of an embodiment of the present invention.

FIG. 1 illustrates a preferred embodiment of the present invention. In this embodiment, a rub-on fingernail decorating system 10 comprises a transparent carrier sheet 12 is attached to a release sheet 14. The release sheet 14 is attached by hinge 18 to the carrier sheet 12. On a surface of the carrier sheet 12 adjacent the release sheet 14 is placed a rub-on transfer art decorative decal. The rub-on transfer art is a decal type material that is pressure sensitive and transferred from the carrier sheet 12 onto another surface, such as a fingernail or toenail, by rubbing the outside surface of the carrier sheet 12. Such rub-on transfer art or rub-on decal transfers are well known in the art field and often used to apply art to other materials such as tile, glass, ceramics, furniture, toys and other craft type applications. Suitable rub-on decals are manufactured from a variety of companies, such as, Bel, Inc. located at 6080 NW 84$^{th}$ Avenue, Miami, Fla., 33166.

FIGS. 2A–E illustrate the ease in which decorative art may be applied to a fingernail in accordance with the teachings of the present invention. The dry rub-on fingernail decorating system 10, illustrated in FIG. 1, provides ease of positioning of the transfer art 16 as well as securely holding the transfer art 16 in position over the fingernail once the desired location is obtained.

Figure 2A:
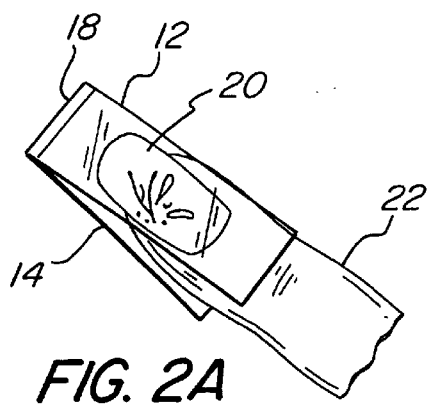
FIGS. 2A–E diagramatically illustrate the method steps of the present invention.

FIG. 2A illustrates the carrier sheet 12 having the transfer art 16 thereon positioned over a fingernail 20 of a finger 22. The release sheet 14 is held by pressure being applied by finger 22 on any flat surface. The carrier sheet 12 is then prevented from moving due to the attachment to the release sheet 14 by hinge or joint 18.

Figure 2B:
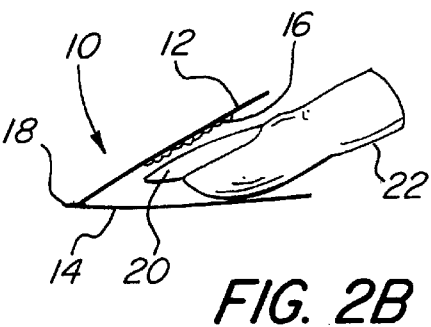

FIG. 2B is another view illustrating the positioning of the finger 22 within the dry rub-on fingernail decorating system 10. As is clearly shown in FIG. 2B, finger 22 holds the release sheet 14 in position, which assures that the rub-on transfer art 16 stays in position over the fingernail 20.

Figure 2C:
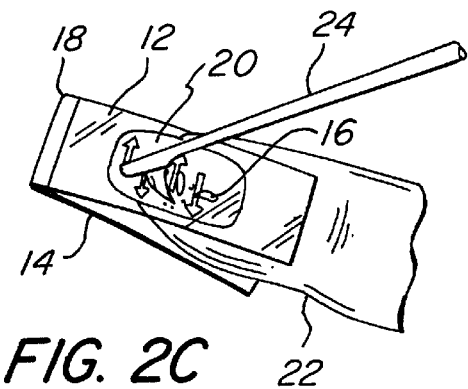

FIG. 2C illustrates rubbing the top surface of the carrier sheet 12 with the transfer art 16 underneath adjacent the fingernail 20. Stick 24 is used to rub the top surface of carrier sheet 12. Stick 24 may be any stick suitable for rubbing or a cuticle stick.

Figure 2D:
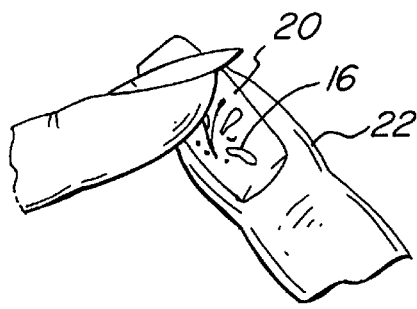

FIG. 2D illustrates removal of the rub-on transfer art system and the smoothing of the transfer art 16 with another finger, if necessary or desired. This may be done to remove any possible air bubbles or to assure that the art 16 has adequately transferred to the fingernail 20.

Figure 2E:
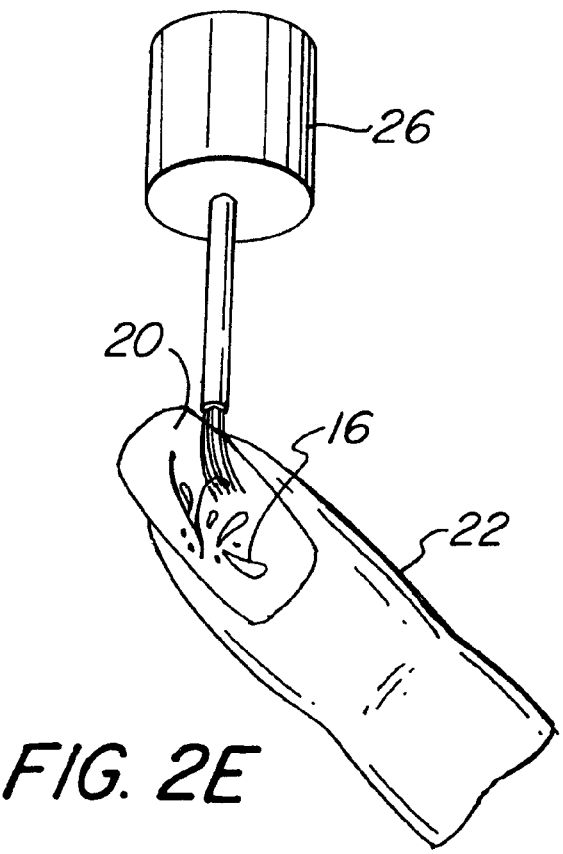

FIG. 2E illustrates an optional final step of applying a sealer over the transfer art 16. A brush 26 may be utilized to apply a sealer over the transfer art 16 and the fingernail 20. The sealer helps to additionally protect and make longer lasting the art 16.

The rub-on transfer art system of the present invention quickly and conveniently positions a decorative rub-on decal or image over a fingernail and transfers it to the fingernail by rubbing only. There is no need for water or liquid paints, resulting in faster application with no drying time. Additionally, the transfer art may be made of a relatively tough material that is long lasting and attractive on the fingernail. The rub-on transfer art system has a structure that permits easy positioning of the transfer art 16 over the fingernail 20. Additionally, the structure permits holding the transfer art in position while rubbing the carrier sheet.

The dry transfer process can produce four color, two color, or one-color images plus gold and silver metallic. Any design can be used. The application process only requires the design or artwork to be placed over the nails in a desired position and rubbed on with a cuticle stick or other suitable device. This action releases the design from the clear plastic transfer sheet and transfers it to the nail. Once it is transferred, a top coat may be applied to seal it. This technique revolutionizes the way nail art or decorations are applied. It is faster, cleaner, neater and easier to control.

Figure 3:
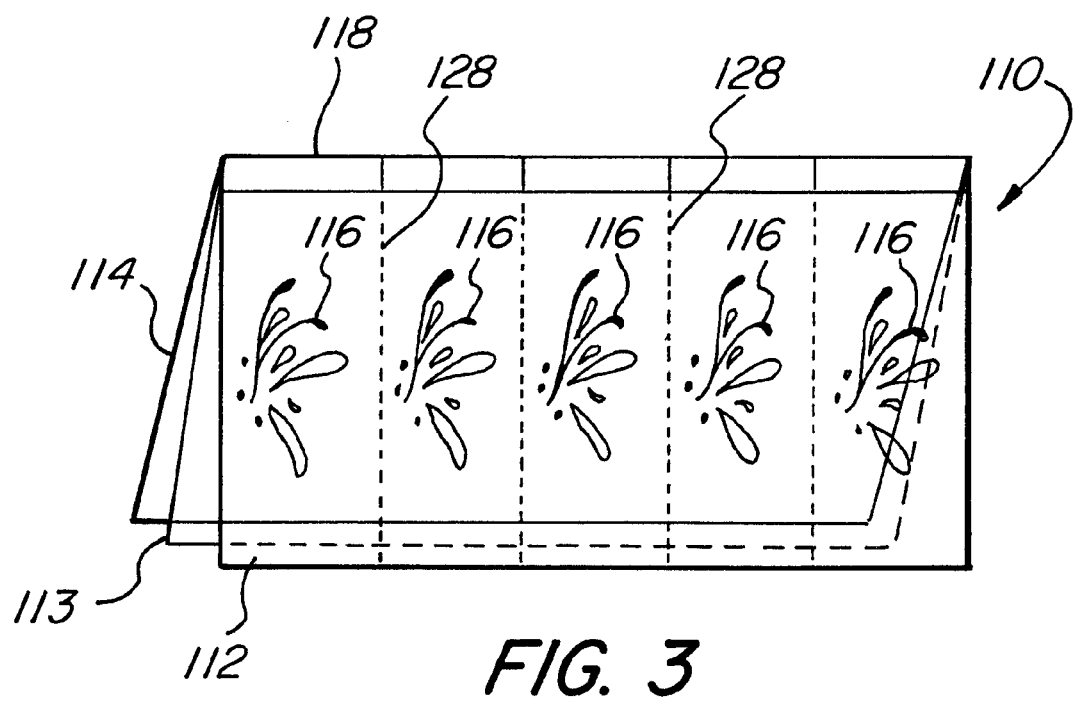
FIG. 3 illustrates another embodiment of the present invention.

FIG. 3 illustrates another embodiment of the present invention. In this embodiment, a multiple rub-on transfer art system 110 has five different transfer arts 116 thereon. Each transfer art 116 is positioned on a portion or section of a transparent carrier sheet 112. The transparent carrier sheet 112 is attached to a release sheet 114 by hinge or joint 118. Joint 118 may be formed by a fold or gluing the release sheet 114 to the transparent carrier sheet 118. Scribe or cut lines 128 are indicated between each transfer art 116. In this embodiment, five nails may be decorated. A protective sheet 113 may be placed between the carrier sheet 112 and the release sheet 114. The protective sheet helps protect the transfer decoration or art 116 from being possibly damaged prior to use.

The multiple rub-on transfer art system 110 may have a generally rectangular shape of a size approximately 2.5 inches or 6.35 centimeters by 1.125 inches or 2.86 centimeters. The carrier sheet 12 has five designs or transfer arts 16 printed thereon that correspond to each finger of a hand. Enough may be provided for 10 nails. The transparent carrier sheet 112 has the designs printed in reverse on the underside of the carrier sheet 112 adjacent the release sheet 114. The release sheet 114 helps protect the transfer art 116. The carrier sheet 112 and the release sheet 114 are glued, taped or otherwise adhered together along a joint forming a hinge 118. The hinge or joint 118 enables the user to slip a finger between the carrier sheet 112 and the release sheet 114. This enables the user to hold the release sheet 114 on a flat surface with their fingertip. When the art is in position over the nail where the design or transfer art 116 is to be applied, the user utilizes a stick, such as a cuticle stick, starting at the top of the nail and rubbing back and forth with pressure across the surface of the carrier sheet 112 over the entire design until the transfer art 116 is completely rubbed over and transferred onto a fingernail. The user may then smooth over the design or transfer art 116 to make sure no bumps or air bubbles are present. The design or transfer art will stay on the fingernails. However, for longer lasting results, a topcoat may be applied to seal the design or transfer art 116 onto the fingernail. The process is repeated for each fingernail. Should any extra material hang over the end of a fingernail, it may easily be removed with a nail file. Additionally, the applied transfer art may be removed with any solvent such as acetone when no longer desired. Additionally, the transfer art system may be sold in a kit comprising a plurality of transfer art systems together with a rubbing stick and a nail file.

Figure 4:
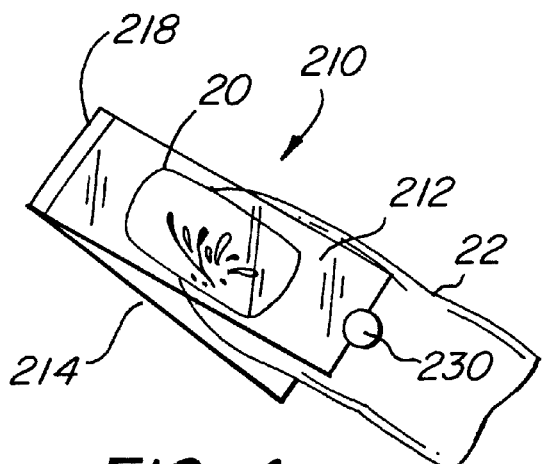
FIG. 4 illustrates another embodiment of the present invention with an adhesive.

FIG. 4 illustrates another embodiment of the present invention. In this embodiment, an adhesive dot 230 is used to aid in holding the carrier sheet 212 in position over the fingernail 20. The adhesive dot 230 may be any adhesive material or equivalent adhesive portion place on the carrier sheet 212 for temporarily holding the carrier sheet 212 in position on the finger 20. In this embodiment, the rub-on transfer art system 210 comprises a transparent carrier sheet 212 attached to a release sheet 214 by hinge 218. The art 216 is adhered to a surface of the carrier sheet 212. The adhesive dot 230 is placed partly on the carrier sheet 212 and the surface of the finger 22.

Figure 5:
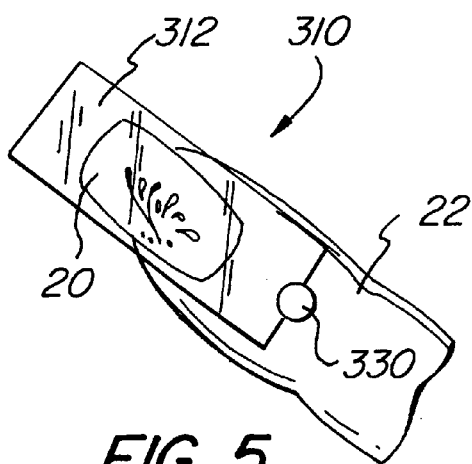
FIG. 5 illustrates another embodiment of the present invention with a positioning adhesive.

FIG. 5 illustrates another embodiment of the present invention. In this embodiment, an adhesive dot 330 is used to hold the carrier sheet 312 and the attached transfer art 316 in position over the fingernail 20. The rub-on transfer art system 310 in this embodiment does not utilize an attached release sheet 214, as illustrated in FIG. 4. However, a protective sheet or other release sheet may be utilized to protect the transfer art 316 during shipping or storage.

Figure 6:
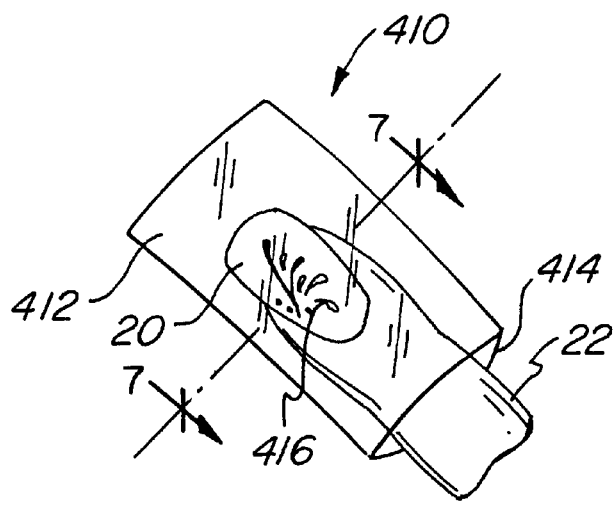
FIG. 6 is a plan view illustrating another embodiment the present invention.
Figure 7:
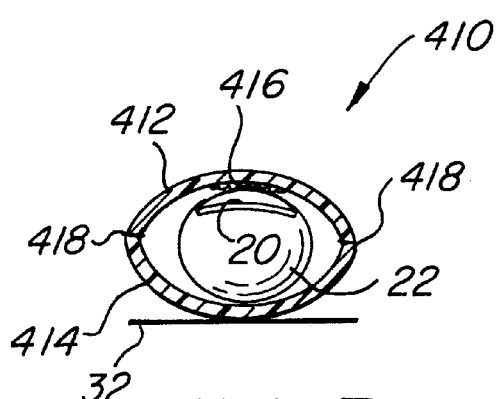
FIG. 7 is a partial cross section taken along line 7—7 in FIG. 6.

FIGS. 6–7 illustrate another embodiment of the present invention. In this embodiment, the rub-on transfer art system 410 comprises a tube with a transparent carrier sheet portion 412 and a release sheet portion 414. The tube may be open at both ends or may have one end closed. The tube may also lay flat until a finger 22 is placed therein.

FIG. 7 is a partial cross section taken along lines 7—7 in FIG. 6, and more clearly illustrates the positioning of a finger 22 within the rub-on transfer art system 410.

Referring to FIGS. 6–7, the transparent carrier sheet portion 412 is attached to the release portion 414 by joint or adhesive sections 418. The rub-on transfer art 416 may be accurately positioned over the desired portion of the fingernail 20 by axially moving the tube or rotating the tube. Once in position, pressure may be placed with the finger 22 on a surface 32 so as to hold the tube in position and correspondingly with the transfer art 416 being held in position over the fingernail 20. The tubular structure of the transfer art system 410 helps to hold the transfer art 416 in the desired position without the need for any additional adhesive or holding. Additionally, the tubular structure helps prevent wrinkling or crinkling of the carrier sheet 412 during rubbing and transfer of the transfer art 416 to the fingernail 20.

Figure 8:
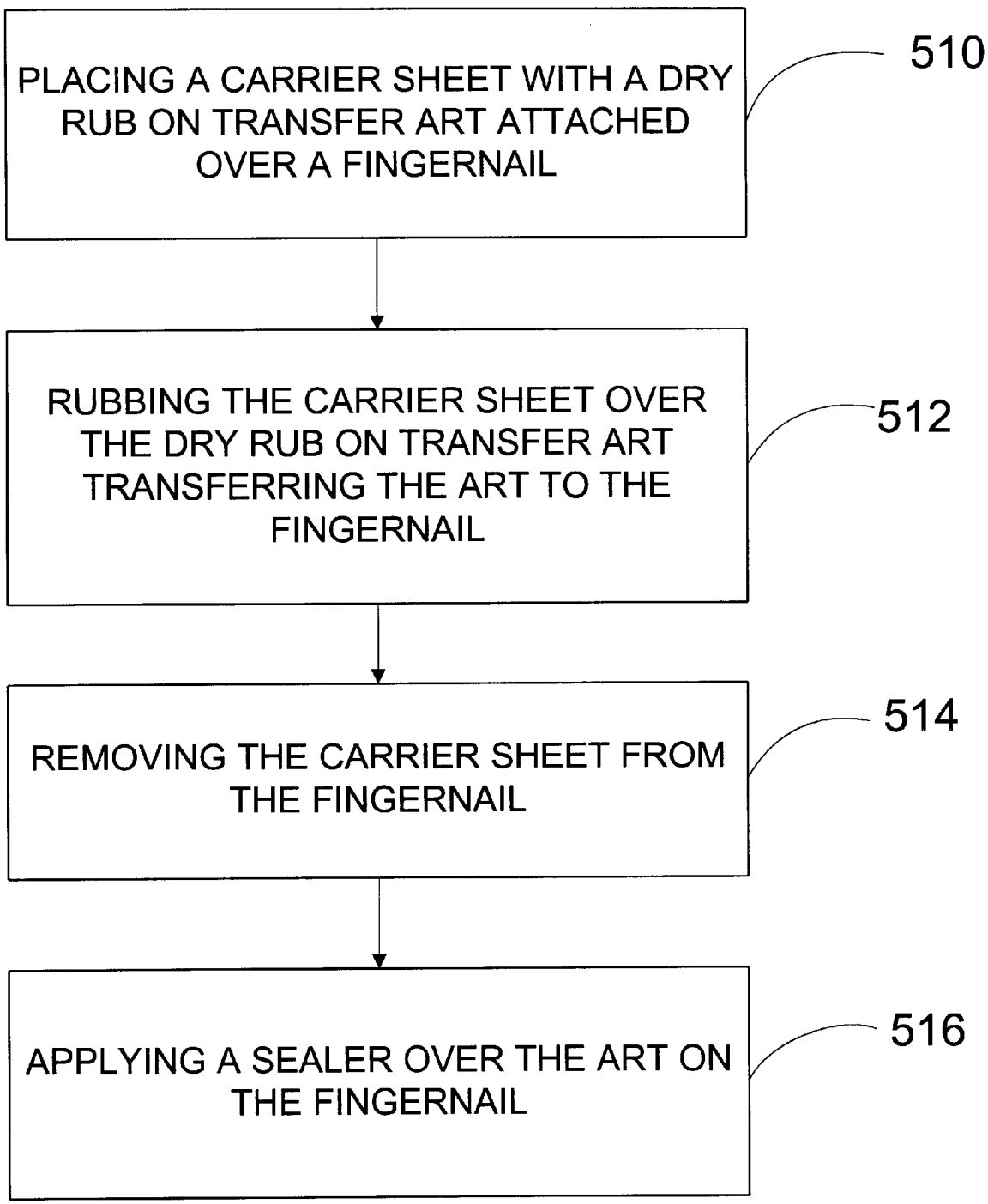
FIG. 8 is a block diagram illustrating the method steps of an embodiment of the present invention.

FIG. 8 is a block diagram illustrating the process or method steps of an embodiment of the present invention. Block 510 illustrates the step or act of placing a carrier sheet with a dry rub-on transfer art attached over a fingernail. Box 512 represents the step or act of rubbing the carrier sheet over the dry rub-on transfer art, transferring the art to the fingernail. Box 514 represents the step or act of removing the carrier sheet from the fingernail. Box 516 represents the step or act of applying a sealer over the art on the fingernail.

The present invention greatly advances the art of applying decorative designs to nails. The present invention provides a rub-on transfer art system that accurately positions a rub-on transfer art or decal over a fingernail that can be rubbed on and applied quickly and easily without any mess or need to wait for drying. It should be appreciated that the present invention may be applied to both fingernails and toenails.

While the preferred embodiments have been illustrated and described, it should be readily appreciated by those skilled in the art that various modifications may be made without departing from the spirit and scope of this invention.

What is claimed is:

1. A dry rub-on transfer art system for applying a decoration to a nail comprising:
   a carrier sheet;
   a dry rub-on transfer art placed on a surface of said carrier sheet; and
   a release sheet attached to said carrier sheet so as to form a hinge,
   whereby said dry rub-on transfer art attached to the carrier sheet may be positioned over the nail and transferred to the nail by rubbing the carrier sheet.

2. A dry rub-on transfer art system for applying a decoration to a nail as in claim 1 further comprising:
   an adhesive dot placed partially on said carrier sheet.

3. A dry rub-on transfer art system for applying a decoration to a nail as in claim 1, wherein:
   said carrier sheet is transparent.

4. A dry rub-on transfer system for applying decoration to a nail as in claim 1 wherein:
   said dry rub-on transfer art comprises a design printed in reverse on an underside of said carrier sheet.

5. A dry rub-on transfer art system for applying a decoration to a nail comprising:
   a carrier sheet;
   dry rub-on transfer art placed on a surface of said carrier sheet; and
   a release sheet attached to said carrier sheet on at least two edges, whereby a tube is formed,
   whereby said dry rub-on transfer art attached to the carrier sheet may be positioned over the nail and transferred to the nail by rubbing the carrier sheet.

6. A dry rub-on transfer art system for applying a decoration to a nail as in claim 5 wherein:
   said dry rub-on transfer art comprises a design printed in reverse on an underside of said carrier sheet.

7. A dry rub-on transfer art system for applying a decoration to a nail comprising:
   a carrier sheet;
   a release sheet attached at one edge to said carrier sheet; and
   a dry rub-on transfer art decoration attached to the surface of the carrier sheet adjacent the release sheet, said carrier sheet and said release sheet form a tube,
   whereby a finger is capable of being placed between said carrier sheet and said release sheet and the transfer art positioned over the nail and held in position during rubbing of said carrier sheet transferring said dry rub-on transfer art decoration to the nail.

8. A dry rub-on transfer art system for applying a decoration to a nail comprising:
   a carrier sheet;
   a release sheet attached at one edge to said carrier sheet; and
   a dry rub-on transfer art decoration attached to the surface of the carrier sheet adjacent the release sheet; and
   an adhesive dot placed partially on said carrier sheet,
   whereby a finger is capable of being placed between said carrier sheet and said release sheet and the transfer art positioned over the nail and held in position during rubbing of said carrier sheet transferring said dry rub-on transfer art decoration to the nail.

9. A dry rub-on transfer art system for applying a decoration to a plurality of nails comprising:
   an elongated carrier sheet having a longitudinal edge;
   an elongated release sheet attached to the longitudinal edge of said elongated carrier sheet, whereby a hinge is formed;
   a plurality of rub-on transfer art decorations attached to a surface of said elongated carrier sheet adjacent said elongated release sheet; and
   a scribe line placed between each of said plurality of rub-on transfer art decorations, whereby each of said plurality of rub-on transfer art decorations may be separated from each other.

10. A dry rub-on transfer art system for applying a decoration to a plurality of nails as in claim 9 further comprising:
    a protective sheet placed between said elongated carrier sheet and said elongated release sheet.

11. A dry rub-on transfer art system for decorating a nail comprising:
    a tube, said tube having a carrier sheet portion and a release sheet portion; and
    a rub-on transfer art attached to an inside surface of said tube,
    whereby a finger is capable of being inserted into an end of said tube and said rub-on transfer art held in positioned over the nail.

* * * * *